TELEVISION CAMERA COMBINED WITH AN ELECTRON MICROSCOPE AND HAVING A PLURALITY OF CATHODOCONDUCTIVE TARGETS

Filed Oct. 9, 1964 2 Sheets-Sheet 1

INVENTOR.
Tsutomu Komoda

BY

Mesten & Mesten

INVENTOR.
Tsutomu Komoda

BY 3,345,514

TELEVISION CAMERA COMBINED WITH AN ELECTRON MICROSCOPE AND HAVING A PLURALITY OF CATHODOCONDUCTIVE TARGETS

Tsutomu Komoda, Hachioji-shi, Japan, assignor to Kabushiki Kaisha Hitachi Seisakusho, Tokyo-to, Japan, a joint-stock company of Japan Filed Oct. 9, 1964, Ser. No. 402,866

Claims priority, application Japan, Oct. 19, 1963, 78,775/38

1 Claim. (Cl. 250—49.5)

ABSTRACT OF THE DISCLOSURE

A television camera incorporated in an electron microscope for the examination of specimens by electron beam irradiation. The device enables selection and use of the optimum target from a plurality of such targets without breaking the common vacuum in the device and interconnected apparatus.

This invention relates to techniques in televising images illuminated by light rays or bombarded by electron beams. More particularly, the invention relates to a new television camera device provided with a plurality of interchangeable targets (photoconductive targets or cathodoconductive targets) whose conductivities vary in response to the light illumination or electron bombardment from an object to be televised.

It is an object of the present invention to eliminate the inefficient procedure necessary in the operation of conventional devices in television camera apparatuses as will be described more fully hereinafter.

More specifically, it is an object of the invention to provide a highly efficient television camera device of the above stated character which is so constructed and arranged as to make possible, without breaking the vacuum in the device and interconnected apparatus, the selection and use of the optimum target from the said plurality of targets in accordance with the irradiation energy being received at any time.

It is another object to provide a television camera device of the above stated character having a relatively simple structure and arrangement.

It is a further object to provide a television camera device of the above stated character which is effectively applicable to a wide range of uses including those for electron microscopes and vidicons.

The foregoing objects, as well as other objects and advantages, have been achieved by the present invention, according to which there is provided a television camera device comprising several targets, the conductivities of which are varied by electron bombardment on said targets, means for introducing the electron beam coming from the specimen onto the surfaces of said targets, means for selectively interchanging a particular target having the most appropriate thickness among said targets in accordance with the energy of said electron bombardment, means for scanning the rear surface of said particular target by means of a low speed scanning electron beam, and means for leading out the electric signal corresponding to the electric pattern of the specimen formed on the said particular target.

The nature, principle, and details of the invention will be more clearly apparent by reference to the following description taken in conjunction with the accompanying drawings in which like parts are designated by like reference characters, and in which.

It is known that, in general, an insulating thin film such as that of amorphous selenium, silicon dioxide, and other like oxides has the property whereby, when it is bombarded by a high-velocity electron beam accelerated by a high voltage of the order of from 20 to 100 kilovolts, a conduction current which is from several tens to several thousands of times this bombarding electron current flows through the film. This property is the so-called cathodoconduction effect.

Figure 1:
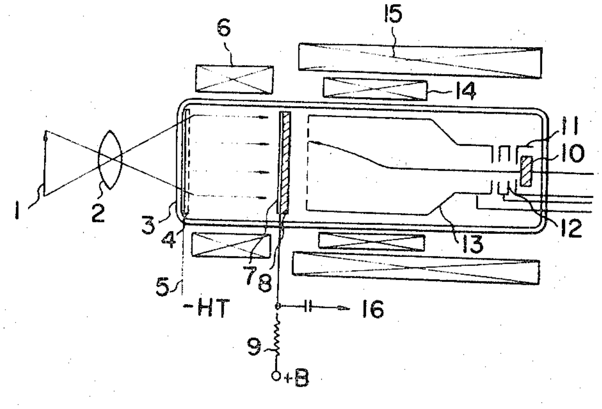
FIGURE 1 is a diagrammatic view in longitudinal section showing a television camera tube provided with a cathodoconductive target.

An example of a television camera tube provided with such a cathodoconductive film is shown in FIGURE 1, and a description of its operational principle is presented hereinbelow as conducive to a full appreciation of the utility of the present invention.

First, the light image of an object 1 is projected by means of an optical lens system 2 onto a photocathode 4, whereupon corresponding photoelectrons are emitted from the photocathode 4. These photoelectrons are accelerated by a voltage of several tens of kilovolts which is impressed across a confronting electrode 7 and a transparent screen 3 consisting of a material such as a nesa film and feeding the photocathode 4. The photoelectrons so accelerated bombard at high velocity the counter-electrode 7 as they are focused by a focus coil 6.

In general, the counter-electrode 7 consists of a thin metal diaphragm, and a thin film 8 of a substance exhibiting the aforementioned conductive effect is deposited by evaporation on the back surface of the thin metal diaphragm, whereby the required electron bombardment target is formed. Accordingly, the high-velocity photoelectrons pass through the counter-electrode 7 and impinge on the conductive film 8, imparting thereto the aforementioned conductive effect.

Therefore, if a scanning electron beam of low velocity is projected from an electron gun comprising a cathode 10, a Wehnelt electrode 11, accelerating electrodes 12 and 13, a deflection coil 14, a focus coil 15, and other parts to scan the conductive film 8 and cause it to be charged with the same potential as the cathode 10, only those parts of the conductive film 8 which are bombarded by the high-velocity electron beam will discharge because of the conductive effect. Consequently, a distribution pattern of positive charge corresponding to the external light image is formed on the conductive film 8. When this film is again scanned by the scanning electron beam, a current merely sufficient to neutralize said positive charge, that is, a charging current corresponding to the current of the above mentioned discharge, flows through the electrode 7 and an electrode 9, and a signal output can be obtained from a terminal 16.

Figure 2:
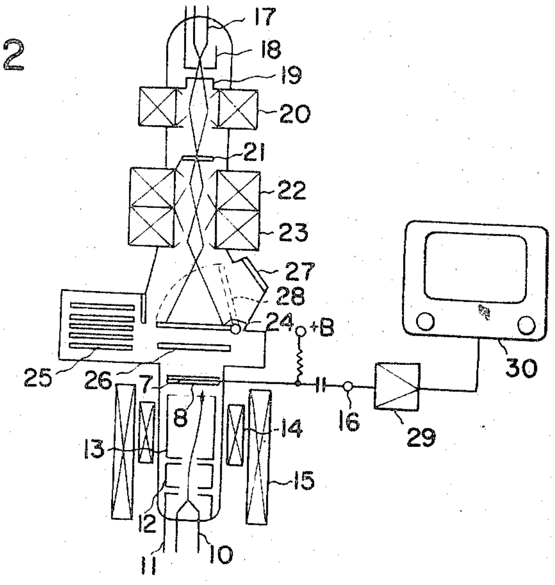
FIGURE 2 is a diagrammatic view in longitudinal section showing the essential construction of an electron microscope within which the camera tube shown in FIGURE 1 is integrally installed.

By installing a camera tube of the above description within an electron microscope as illustrated in FIGURE 2, it is possible to project the imaging electron beam forming the microscope image directly onto the aforementioned conductive film and, through the signal output obtained by scanning the back of the conductive film with a low-velocity, scanning electron beam, to reproduce a clear electron microscope image on a television receiver screen.

The example electron microscope so arranged as shown in FIGURE 2 is provided with a filament 17 for emitting an electron beam, a Wehnelt cylinder 18, an anode 19, a condenser lens 20, magnifying lenses 22 and 23, and a fluorescent plate 24. The specimen 21 to be examined is placed between the condenser lens 20 and the magnifying lenses 22 and 23. A photographic dry plate 26 is positioned downstream from the fluorescent plate 24, photographic dry plates 25 for replenishment being stored at one side.

When this microscope is in the state for ordinary use, the image is formed on the fluorescent plate 24 and viewed through viewing window 27. When the fluorescent plate 24 is swung to the position 28 indicated by dotted lines, photographic recording of the image becomes possible by projecting the imaging electron beam directly onto the dry plate 26.

In the apparatus arrangement shown in FIGURE 2, there is further provided at the lower part the aforedescribed television camera tube, that is, the camera tube shown in FIGURE 1 without the light image projection section and the imaging electron projection section to the left of the counter-electrode 7 (accordingly, its construction being exactly the same as that of the structure shown in FIGURE 1 to the right of, and including, the counter-electrode 7). By this arrangement, the imaging electron beam can be directed to pass directly through a signal output electrode 7 (the aforesaid counter-electrode), thereby to impinge on the conductive film 8 and impart thereto the aforementioned cathodoconductive effect.

Thus, by swinging the fluorescent plate 24 to the position 28, removing the dry plate 26 from the electron beam path, and directing the imaging electron beam onto the conductive film 8, a positive charge distribution pattern can be formed on the conductive film 8 in correspondence with the electron microscope image, and an image signal output in accordance with the scanning of the scanning electron beam can be obtained from the terminal 16. Furthermore, by introducing this signal through an amplifier 29 into a television receiver 30 and, in synchronism with said scanning, scanning the fluorescent surface of the cathode-ray tube of the receiver 30, it is possible to reproduce a clear electron microscope image on the cathode-ray tube screen.

Figure 3:
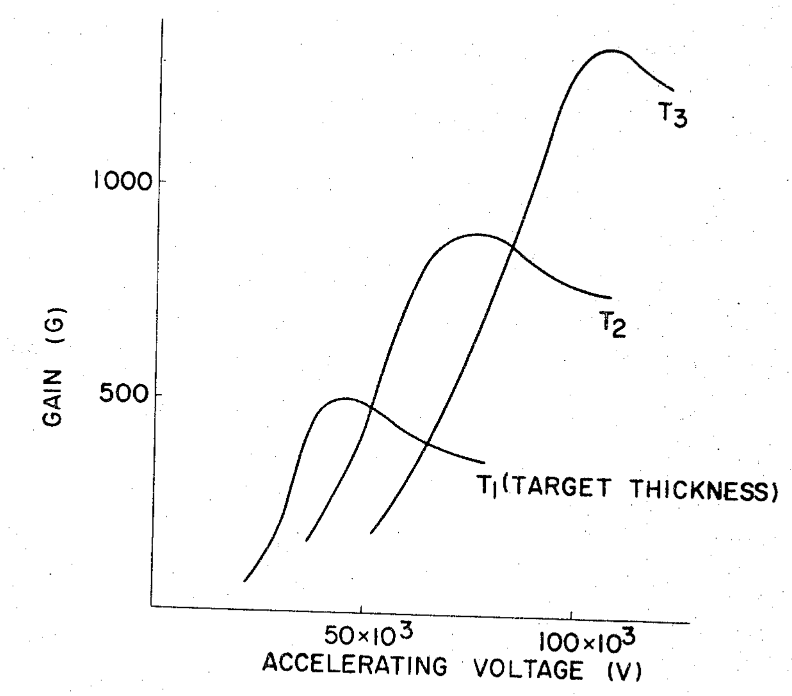
FIGURE 3 is a graphical representation indicating curves of gain versus accelerating voltage to be referred to in the following description of the operational principle of the device according to the invention.

In an apparatus of the character exemplified above, in general, the energy (accelerating voltage) of the bombarding electron beam (the aforementioned imaging electron beam) and the gain G of the conduction current amplified within the target have a relationship as indicated in FIGURE 3 in which the film thickness T of the target is taken as a parameter.

It is to be observed from FIGURE 3 that with a target (film thickness $T_1$), for example, with which maximum gain can be obtained at an accelerating voltage of 50 kv. or lower, the gain decreases at accelerating voltages higher than 50 kv. With a target (film thickness $T_3$) which is the optimum at an accelerating voltage of 100 kv., only a sensitivity which is almost useless for practical use with respect to an electron beam of 50 kv. accelerating voltage can be obtained. From this it is apparent that, in the case of devices such as television camera devices of the cathdoconductive type as described above, it is necessary to select conductive targets of the optimum thickness in accordance with the energy of the bombarding electron beam.

However, conventional television camera devices of this character such as, for example, the aforementioned television electron microscope, ordinarily are provided with only one conductive target each and do not have any provision for selecting optimum targets in accordance with necessity. In other words, it appears that in the design of known devices of this character, no consideration whatsoever has been given to the use of targets most suitable for particular conditions of use.

In general, however, in the case of an electron microscope, for instance, the accelerating voltage used is varied in the range of 50 to 100 kv. as necessary in accordance with the nature of the specimen to be examined. Consequently, when the aforementioned conventional television electron microscope is used, and it is desired to obtain the maximum sensitivity in accordance with the accelerating voltage used, it is necessary to break the vacuum in the apparatus each time to change the target. Such a procedure is extremely inefficient.

In view of the above described state of the art, the present invention contemplates the provision of a highly efficient television camera device of an arrangement and construction in which a plurality of interchangeable targets of suitably graded characteristics are provided, and whereby the target most suitable for the optimum conditions in accordance with the electron bombardment energy of the electron beam at any particular time can be selectively used without the necessity of breaking the vacuum in the apparatus.

Figure 4:
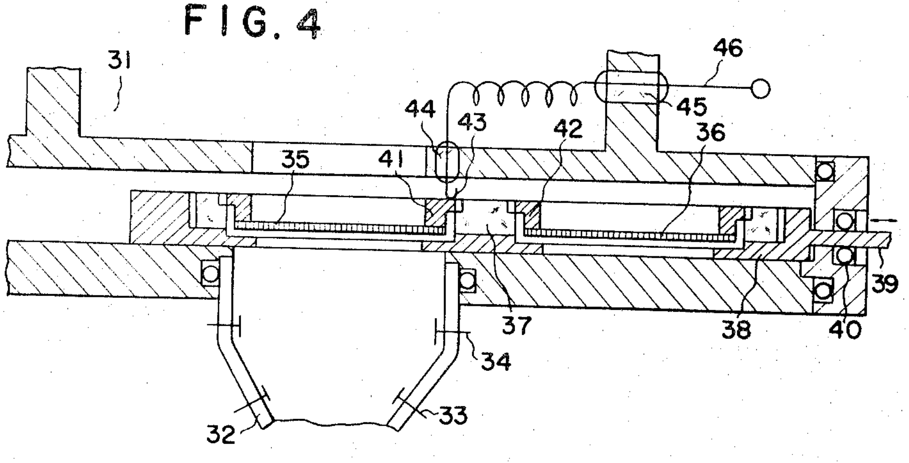
FIGURE 4 is a diagrammatic view in section showing the essential construction and arrangement of a preferred embodiment of the invention.

In one embodiment of the invention, whose essential parts are shown in FIGURE 4, a cathodoconductive type, a television camera tube having a glass tube 32 is disposed coaxially with the imaging electron beam path of an electron microscope, below the image viewing chamber 31 of the microscope. The camera tube 32 is provided therewithin with deceleration electrodes 33 and 34 for the scanning electron beam. At a level between the bottom of the viewing chamber 31 and the upper part of the glass tube 32, there are provided interchangeable cathodoconductive targets 35 and 36, each being an optimum target for a particular accelerating voltage range and supported, respectively, on metal support fittings 41 and 42, which in turn are held by a target holder comprising insulators 37 and a holder structure 38. The holder structure 38 is caused to slide left and right (as viewed in FIGURE 4) by a slide actuator 39 which is manipulated from the outside, whereby the appropriate target can be positioned on the apparatus axis as necessary without breaking the vacuum in the apparatus.

The slide actuator 39 is provided with a vacuum seal 40 at its point of entry into the evacuated part of the apparatus. An electrical contact 43 for leading out signals is disposed to contact the metal support fitting 41 in operational position and is connected to a lead 46 supported by insulators 44 and 45, television image signals corresponding to the imaging electron beam being led out by the lead 46 and, after amplification by a suitable amplifier, being sent to a television receiver where a clear image is reproduced as described hereinbefore.

By the above described arrangement and construction, the targets 35 and 36 can be selectively interchanged by means of the slide actuator 39 from a point outside of the evacuated parts of the apparatus, and the appropriate target can be positioned for operation.

For the sake of simplicity of description, only two interchangeable targets are mentioned in the above description with respect to the embodiment of the invention. In actual practice, however, since in many cases the accelerating voltage used in electron microscopes is divided into three or more stages such as 50 kv., 75 kv., and 100 kv., it is preferable to provide, accordingly, more than two targets.

Furthermore, although in the above description only a television electron microscope of the cathodoconductive type is considered, the present invention is not limited to the example set forth above, the teachings of the invention being applicable also to television camera devices in general. For example, it is known that the conductivity of the aforementioned amorphous selenium is caused to vary also by light illumination. Therefore, a conductive target wherein this phenomenon is utilized can be used for both light illumination and electron bombardment (photoconductive and cathodoconductive target) from an object to be televised.

In view of this feature, the present invention can be applied to a camera tube such as a vidicon by providing within the same tube assembly a plurality of built-in targets having sensitivities which are optimum respectively for ultra-violet, visible light, and infrared rays and arranging these targets to be interchangeable within the vacuum of the camera tube, whereby the same effectiveness as described hereinabove can be attained.

As described above, by the practice of the present invention, it is possible within a television camera apparatus to select and use a target exhibiting optimum performance for each condition of use, such as a change in the accelerating voltage, without the necessity of breaking the vacuum within the apparatus, whereby the operational efficiency of the apparatus is remarkably increased. Accordingly, it is possible to derive maximum performance from electron apparatus provided with the interchangeable targets according to this invention.

As mentioned briefly hereinabove, the foregoing disclosure relates principally to only a preferred embodiment of the invention, but it is intended to cover all changes and modifications of the example of the invention herein chosen for the purposes of the disclosure, which do not constitute departures from the spirit and scope of the invention as set forth in the appended claim.

What I claim is:

A cathode ray tube incorporated in an electron microscope wherein a specimen is examined by electron beam irradiation and its electron image shown on the screen of said tube, which comprises a vidicon disposed in the electron path of said microscope in a common vacuum chamber, and a receiver; said microscope having means for emitting an electron beam; means for holding the specimen within the path of said beam; a viewing chamber between the specimen holding means and the vidicon; a fluorescent plate swingably disposed within said viewing chamber; and a plurality of cathodoconductive targets of different thicknesses and having a front and a rear surface each, slidably disposed between said viewing chamber and the screen of said vidicon; means for selectively sliding one of said targets into the electron beam path in accordance with the energy of the electron beam; the impingement of said electron beam on the front surface of said targets varying their cathodoconductivity; said vidicon further comprising a cathode, a deflection coil, a focus coil and deceleration electrodes producing a low velocity scanning beam which impinges on the rear surfaces of said targets; and means for converting the electron image produced on said targets to electrical signals appearing in said receiver.

References Cited

UNITED STATES PATENTS

| | | | |
|---|---|---|---|
| 2,894,160 | 7/1959 | Sheldon | 250—49.5 |
| 3,051,860 | 8/1962 | Haine et al. | 313—65 |

RALPH G. NILSON, *Primary Examiner.*

W. F. LINDQUIST, *Assistant Examiner.*